United States Patent
Sapsay et al.

(10) Patent No.: US 9,890,876 B2
(45) Date of Patent: Feb. 13, 2018

(54) METHOD FOR INSTALLING A STATIONARY SUPPORT IN A PLANNED POSITION

(71) Applicants: Public Joint Stock Company "Transneft", Moscow (RU); Joint-stock company "Transneft Siberia", Tyumen (RU); L.L.C. "Transneft research and development institute for oil and oil products transportation", Moscow (RU)

(72) Inventors: Alexey Nikolaevich Sapsay, Moscow (RU); Yurii Borisovich Mikheev, Moscow (RU); Valeriy Vyacheslavovich Bondarenko, Chelyabinsk (RU); Vitaly Ivanovich Surikov, Balashikha (RU); Vladimir Ivanovich Fedota, Moscow (RU); Yury Vasilevich Bogatenkov, Tyumen (RU); Pavel Ivanovich Shoter, Moscow (RU)

(73) Assignees: JOINT STOCK COMPANY "TRANSNEFT SIBERIA", Tyumen (RU); PUBLIC JOINT STOCK COMPANY "TRANSNEFT", Moscow (RU); LIMITED LIABILITY COMPANY "TRANSNEFT RESEARCH AND DEVELOPMENT FOR OIL AND OIL PRODUCTS TRANSPORTATION", Moscow (RU)

( * ) Notice: Subject to any disclaimer, the term of this patent is extended or adjusted under 35 U.S.C. 154(b) by 0 days.

(21) Appl. No.: 15/226,893

(22) Filed: Aug. 2, 2016

(65) Prior Publication Data
US 2016/0341338 A1 Nov. 24, 2016

Related U.S. Application Data

(63) Continuation of application No. PCT/RU2014/000220, filed on Mar. 28, 2014.

(51) Int. Cl.
*F16L 1/024* (2006.01)
*F16L 3/18* (2006.01)
(Continued)

(52) U.S. Cl.
CPC .............. *F16L 1/0246* (2013.01); *F16L 1/026* (2013.01); *F16L 3/18* (2013.01); *F16L 3/20* (2013.01); *F16L 57/00* (2013.01)

(58) Field of Classification Search
CPC ......... F16L 1/0246; F16L 57/00; F16L 1/026; F16L 3/18; F16L 3/20
(Continued)

(56) References Cited

U.S. PATENT DOCUMENTS

| 492,593 A | | 2/1893 | Taylor | |
|---|---|---|---|---|
| 675,104 A | * | 5/1901 | Oberle | F16L 3/26 248/49 |

(Continued)

FOREIGN PATENT DOCUMENTS

| CA | 1232255 | 2/1988 |
|---|---|---|
| CN | 201071981 | 6/2008 |

(Continued)

OTHER PUBLICATIONS

Herbert E. Lindberg; "*Alaska Pipeline in Fairbanks*"; http://lindbergIce.com/alaska/alaska2.htm ; posted Aug. 21, 2000; (7 pages).

(Continued)

*Primary Examiner* — Muhammad Ijaz
(74) *Attorney, Agent, or Firm* — One LLP; Jonathan Jaech

(57) ABSTRACT

A pipeline support for use in severe geological conditions such as permafrost provides stability, strength and immovability of the pipeline support under relatively high pressure and that that allows an adjustment of a height or slope of the (Continued)

pipeline support. A method of using the support includes controlling the height or slope angle of the support during operation of the pipeline support. A spool of the support is installed and fixed on two support axes that are transverse beams installed in support frames and that can be moved along with the support spool. After that, movable power-operated mechanisms are positioned under each support axis. These mechanisms lift or lower the spool and support axes to the desired height and slope. The support axes are then fixed in frames at the desired height and spool slope angle.

14 Claims, 2 Drawing Sheets

(51) Int. Cl.
  *F16L 1/026* (2006.01)
  *F16L 57/00* (2006.01)
  *F16L 3/20* (2006.01)
(58) Field of Classification Search
  USPC ............................................. 248/49, 59
  See application file for complete search history.

(56) References Cited

U.S. PATENT DOCUMENTS

| | | | | |
|---|---|---|---|---|
| 675,106 | A * | 5/1901 | Oberle | F16L 3/26 248/182.1 |
| 921,399 | A * | 5/1909 | Hersey | F16L 3/18 138/113 |
| 1,470,529 | A | 10/1923 | Gerber | |
| 1,703,605 | A | 2/1929 | Ballantyne | |
| 1,906,209 | A | 4/1933 | Harding et al. | |
| 2,151,321 | A | 3/1939 | Glover | |
| 2,533,370 | A | 12/1950 | Haug | |
| 2,561,540 | A * | 7/1951 | Sherbrooke | F16L 3/00 248/49 |
| 2,846,168 | A | 8/1958 | Schroeter | |
| 3,026,076 | A | 3/1962 | Bender | |
| 3,072,777 | A * | 1/1963 | McKechnie | B23H 9/001 219/69.2 |
| 3,168,114 | A | 2/1965 | Martin | |
| 3,298,644 | A | 1/1967 | Sherburne | |
| 3,390,854 | A | 7/1968 | Sherburne | |
| 3,863,679 | A | 2/1975 | Young | |
| 3,963,205 | A * | 6/1976 | Hageman | F16L 3/00 248/55 |
| 4,128,219 | A * | 12/1978 | Kaigler, Jr. | F16L 1/026 248/49 |
| 4,139,142 | A * | 2/1979 | Maple | F16L 3/16 228/175 |
| 4,140,292 | A * | 2/1979 | Kaigler, Jr. | F16L 3/16 248/49 |
| 4,244,543 | A | 1/1981 | Ericson | |
| 4,343,497 | A | 8/1982 | Bot | |
| 4,403,759 | A | 9/1983 | Hicks | |
| 4,445,656 | A * | 5/1984 | Leitch | F16L 3/1058 24/23 R |
| 4,530,478 | A * | 7/1985 | McClellan | F16L 59/135 138/106 |
| 4,750,841 | A * | 6/1988 | Hicks | B29C 47/08 248/901 |
| 4,783,030 | A * | 11/1988 | Buerhop | F16L 3/00 248/49 |
| 4,787,583 | A * | 11/1988 | Morton | F16L 1/026 248/55 |
| 4,804,158 | A | 2/1989 | Collins et al. | |
| 4,826,113 | A | 5/1989 | Winters | |
| 5,028,019 | A | 7/1991 | Hardtke | |
| 5,102,073 | A | 4/1992 | Lestenkof, Jr. | |
| 5,163,642 | A | 11/1992 | Torrens et al. | |
| 5,393,024 | A * | 2/1995 | Daubenspeck | F24H 9/06 248/146 |
| 5,749,548 | A | 5/1998 | Tamura et al. | |
| 5,924,656 | A * | 7/1999 | Okada | F16L 3/00 138/106 |
| 6,206,613 | B1 * | 3/2001 | Elkins | F16L 3/02 248/49 |
| 6,450,736 | B1 * | 9/2002 | Eck | F16L 1/0246 138/106 |
| 6,502,791 | B2 | 1/2003 | Parker | |
| 7,213,790 | B2 * | 5/2007 | Bailey | F16L 3/1016 248/65 |
| 9,404,605 | B2 * | 8/2016 | Booth | H02G 7/053 |
| 9,447,899 | B2 * | 9/2016 | Minami | B64D 37/005 |
| 9,605,773 | B1 * | 3/2017 | Tarapchak | F16L 3/1091 |
| 2007/0187556 | A1 | 8/2007 | Yoshitake | |
| 2011/0309207 | A1 | 12/2011 | Senkpiel | |
| 2012/0181396 | A1 * | 7/2012 | Simmons | F16L 3/18 248/72 |
| 2013/0048798 | A1 | 2/2013 | Bock | |
| 2013/0115009 | A1 | 5/2013 | Mebarkia | |
| 2014/0021420 | A1 | 1/2014 | Beelen et al. | |
| 2014/0346291 | A1 | 11/2014 | Booth | |
| 2015/0059826 | A1 * | 3/2015 | Reed | F24J 2/5264 136/246 |
| 2015/0239023 | A1 | 8/2015 | Ryosuke | |
| 2016/0047496 | A1 * | 2/2016 | O'Connell | F16L 59/16 248/72 |
| 2016/0138734 | A1 * | 5/2016 | Keller | F16B 9/026 248/49 |
| 2016/0340859 | A1 * | 11/2016 | Lisin | F16L 3/1091 |
| 2016/0340860 | A1 * | 11/2016 | Lisin | F16L 59/21 |
| 2016/0341338 | A1 * | 11/2016 | Sapsay | F16L 3/20 |
| 2017/0089492 | A1 * | 3/2017 | Hargrave | F16L 3/1058 |

FOREIGN PATENT DOCUMENTS

| | | |
|---|---|---|
| CN | 201455598 | 5/2010 |
| CN | 101975312 | 2/2011 |
| CN | 201884790 | 6/2011 |
| CN | 201884792 | 6/2011 |
| CN | 202302330 | 7/2012 |
| CN | 202992525 | 6/2013 |
| CN | 203092062 | 7/2013 |
| CN | 103307364 | 9/2013 |
| CN | 103398234 | 11/2013 |
| CN | 203273194 | 11/2013 |
| CN | 103574173 | 2/2014 |
| CN | 103807570 | 5/2014 |
| CN | 203585572 | 5/2014 |
| CN | 104048104 | 9/2014 |
| CN | 104110527 | 10/2014 |
| CN | 203948785 | 11/2014 |
| CN | 203979646 | 12/2014 |
| CN | 203979658 | 12/2014 |
| CN | 104653871 | 5/2015 |
| CN | 104653875 | 5/2015 |
| CN | 104653952 | 5/2015 |
| CN | 204493888 | 7/2015 |
| CN | 105240623 | 1/2016 |
| DE | 3426968 | 1/1986 |
| DE | 9405929 | 6/1994 |
| EP | 1398552 | 3/2004 |
| GB | 426415 | 4/1935 |
| RU | 2253790 | 6/2005 |
| RU | 64315 | 6/2007 |
| RU | 64316 | 6/2007 |
| RU | 65164 | 7/2007 |
| RU | 65167 | 7/2007 |
| RU | 2335685 | 10/2008 |
| RU | 85974 | 8/2009 |
| RU | 99015 | 11/2010 |
| RU | 119057 | 8/2012 |
| RU | 120180 | 9/2012 |
| RU | 124350 | 1/2013 |
| RU | 127853 | 5/2013 |
| RU | 128274 | 5/2013 |
| RU | 2499940 | 10/2013 |

(56) References Cited

FOREIGN PATENT DOCUMENTS

| RU | 2572428 | 9/2015 |
|----|---------|--------|
| SU | 556273 | 4/1977 |
| SU | 1099172 | 6/1984 |
| WO | WO2011/145983 | 11/2011 |
| WO | WO2015/147682 | 10/2015 |

OTHER PUBLICATIONS

Piping Technology and Products, Pipe Supports Catalog; *U-Bolt Cradle Support with Guide and Slide Plate* (Fig. 800); http://web.archive.org/web/20120602203447/http://www.pipingtech.com/products/ptpcat/pipeshoes/nofw/fig800.htm ; Printed Jul. 21, 2016 (1 page).

Piping Technology & Products, The Pipe Supports Blog; *Pipe Anchors*; http://www.pipingtech.com/blog/tag/pipe-anchors/ ; (6 pages).

\* cited by examiner

METHOD FOR INSTALLING A STATIONARY SUPPORT IN A PLANNED POSITION

CROSS-REFERENCE TO RELATED APPLICATIONS

This application claims the benefit and priority of PCT Pat. App. No. PCT/RU2014/000220, titled METHOD FOR INSTALLING A STATIONARY SUPPORT IN A PLANNED POSITION and filed on Mar. 28, 2014, also published as WO/2015/147685.

FIELD

The invention relates to the field of above ground pipeline construction and, more particularly, to a spool assembly support for absorbing linear extensions of the pipeline due to temperature and pressure fluctuations of the transported fluid, and for adjusting a height of the saddle in response to pipeline changes.

BACKGROUND

Pipelines can be separated into expansion blocks which can compensate for temperature-caused deformations of the pipeline. Saddle supports may be installed at the ends of each expansion block. Saddle supports may be installed during a process of laying constructed and reconstructed above-ground pipelines of various diameters and various pressures.

Various different saddle supports and methods for installing the saddle supports are known in the art.

For example, a "pipeline support device" according to Canadian patent No. CA1232255 is relatively easy to construct. It provides an option to adjust a height of the pipeline. The support is a massive, flat support on which an axial element, or stand, is attached. The pipeline is attached to the stand by a brace. The brace has a bolt fixture. If the height of the pipeline is changed, the height of the brace may be shifted upwards or downwards along the stand to match the pipeline.

This pipeline support device may be used for small diameter pipelines (up to 325 mm), however, it is not applicable for major pipelines.

An option to change a position of a pipeline's support is also disclosed by Chinese utility patent No. CN201884792. This patent relates to a pipeline support that includes a top support and a lower supporting shaft. The pipeline is installed on the top support and is located on transverse shafts. Vertical supports that are firmly fixed to the supporting shaft are hollow. Axes with threads are installed into the vertical supports. The support is maintained at its vertical position due to wringing. The shifting mechanism is protected from external effects, which suggests the possibility of operating such device under virtually all weather conditions. Moreover, the device contains a minimal number of detachable joints which also increases longevity of the device's fixture. The pipeline is loosely installed on the top support, which provides the option of applying this support in pipelines having any diameter.

The method for changing the height of this support is quite labor-intensive. This is because the axes with threads are under constant pressure from the weight of the pipeline having the transported product. Thus, one needs to unload the weight to maintain the axes' position. In order to change the height, one must lift the pipeline using lifting mechanisms.

RF utility patent No. 64315 discloses an adjustable support that contains a foundation and a saddle. The support is equipped with wedges that are symmetrically located on a base and linked to each other using a pair of screws, allowing free movement along the support surface. The pipeline's saddle is supported by planks and ribs, the ribs are coupled to the planks at right angles, and the planks are installed on sloped surfaces of wedges. Before installation of the support, the pipeline is lifted and fixed. The support is freed from the assembly for transportation. The foundation is laid with closed wedges at a medium position on a concrete pillar or a pile. With the help of the screw support, the wedges are opened up and the saddle is installed on sloped surfaces of wedges using planks. The saddle is put under the pipeline in such way that a support surface on the saddle, such as a gasket, is parallel to the internal surface of the pipeline. The pipeline is put down after preliminarily lubricating surfaces of the planks, the wedges, and the screw threads.

A method of installation and adjusting a pipeline support is described in RF patent No. 2335685, titled "adjustable support of the closed loop pipeline". The method may be used for construction of self-compensating, above-ground major pipelines. The major pipeline and a saddle of its support include two vibratory sensors. A strain sensor is installed on the major pipeline. The closed loop system gives a command to lift the saddle if the signals of vibratory sensors are different. Lifting of the major pipeline's saddle stops in response to a signal from the strain sensor.

This invention and the method to control its position are difficult to apply under permafrost conditions and critically low temperatures, such as those experienced in the Extreme North. This is due to the likelihood of damage to the sensors.

The closest analog to the present disclosure is implemented using an adjustable screw force-measuring support of a pipeline, disclosed by RF patent No. 85974. A support contains a saddle linked to movable power-operated weight measuring mechanisms and movable power-operated mechanisms, such as screw jacks, by nuts. The weight measuring mechanisms are positioned on stands of the support. Power-measuring devices are installed under the jacks.

The method of adjusting a height of this support is quite labor-intensive because threaded axes are under constant pressure from the weight of the pipeline and the transported product. Thus, the axes must be unloaded to adjust the position. To adjust the height, the pipeline must be lifted using a lifting mechanism. Thus, this method can only be implemented for pipelines having a small diameter.

The objective of the disclosure is to provide an option for precise setup of a height and a slope of a pipeline support during assembly of the pipeline, and an option to adjust the height of the pipeline during its operation.

The result achieved using the method of the disclosure is increased stability, strength and immovability of the construction under high pressure and an opportunity to change the height of the pipeline's support during use.

SUMMARY

The objective is solved using a method for installing a saddle support to a desired position with an option to adjust a height of the pipeline during operation. A pipeline support spool is placed and fixed upon two support axes that are transverse beams installed within the support frame, and are movable within the support spool. Afterwards, movable power-operated mechanisms are positioned under each support axis and used to lift or lower the spool and the support axes to a desired height and a desired slope angle. The spool is fixed in the desired position by fixing the support axes in frames via adjustable plates at the desired height and spool slope angle. Support spool butts are welded to the pipeline.

The claimed method may also be used for adjusting the saddle support's height during operation of the pipeline. In order to do so, the support axes may be loosened and movable power-operated mechanisms may be positioned under each support axis. The movable power-operated mechanisms may lift or lower the spool and the support axes to the desirable height while preserving the critical spool slope angle. After that, the achieved desirable position is fixed by fixing the support axes in the frames using adjustable plates.

The claimed method is implemented using a saddle panel support that includes the support spool and four support frames. The support spool includes the pipe equipped with an external case and a heat-insulated layer, along with an internal shell fixed in its central part to which stiffeners are tightly attached. Each support frame is a load-bearing, stiff, welded structure and is used to transfer the weight and the stress of the pipeline to the pilework of the pile foundation. The support frame supports the adjustable plates, which in turn support the support axes to the desirable position for the desired height and slope angle. The frames include vertically oriented screens fixed to horizontal subframes through a bolt joint. Axis stops are installed in the screens and may translate through the guideways into which the support axes are installed. The support axes are equipped with stiffeners fixed to the support spool.

To fix the support axes, sets of adjustable plates are installed on detachable stops under the support axes, and adjustable screws are installed in top stops above the support axes. Hydraulic jacks are used as movable power-operated mechanisms. The detachable transportation stop is positioned between frames during installation of the saddle support at one side of the pipeline. During adjustment of the position of the saddle support, the support spool is set to the desired height based on the expected amount of soil heaving (subsidence) under the pipe foundation of the support. In order to set the support's slope angle during installation, adjustable plates are positioned under the first support axis and adjustable plates are removed from under the other support axis. The thickness of added and removed plates correspond to each other, such that a thickness removed from under the first axis is the same as the thickness added under the second axis. During installation of the support, dielectric pads are placed between screens and subframes to provide electrical insulation from the pile foundation. Furthermore, bolt joints of the screens and the subframes are electrically insulated by plugs and gaskets made of the dielectric material. The frames are equipped with side stops that transfer stresses from the pipeline to the pile foundation through the dielectric pads.

BRIEF DESCRIPTION OF THE DRAWINGS

The claimed invention is illustrated by the following drawings.

DETAILED DESCRIPTION

Figure 1:
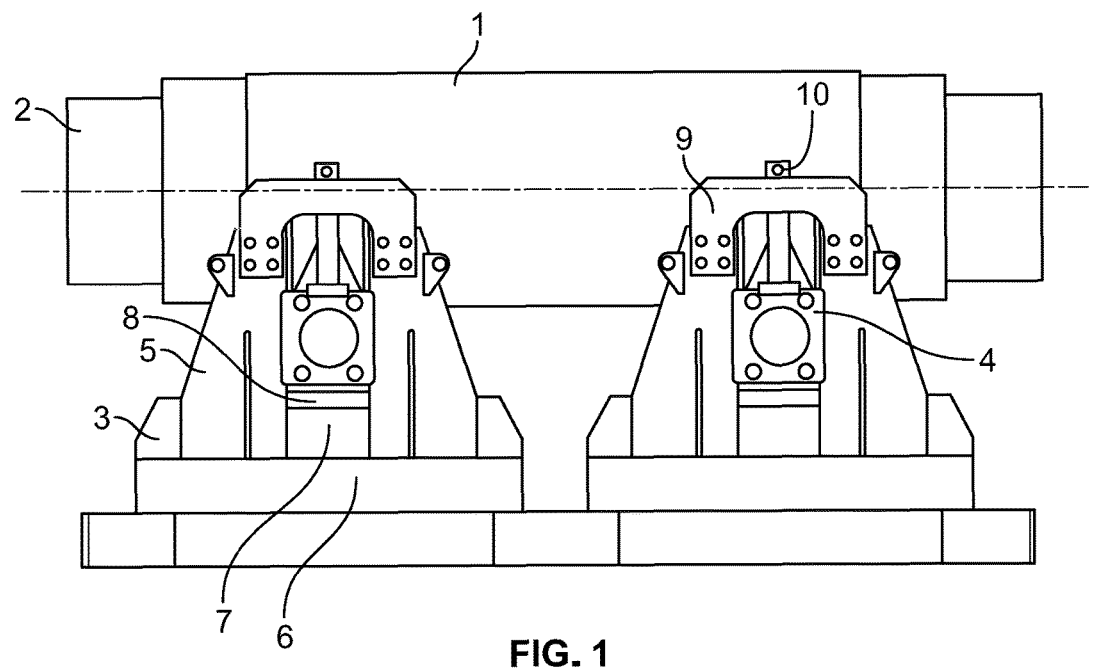
FIG. 1 illustrates a side view of a saddle support capable of having its height adjusted.
Figure 2:
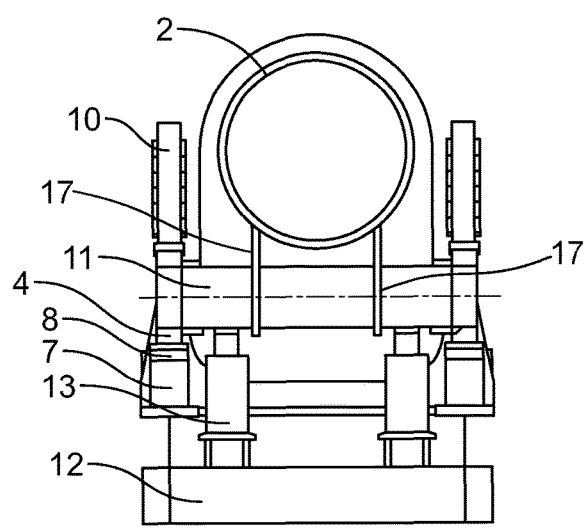
FIG. 2 illustrates a front view of a saddle support capable of having its height adjusted.
Figure 3:
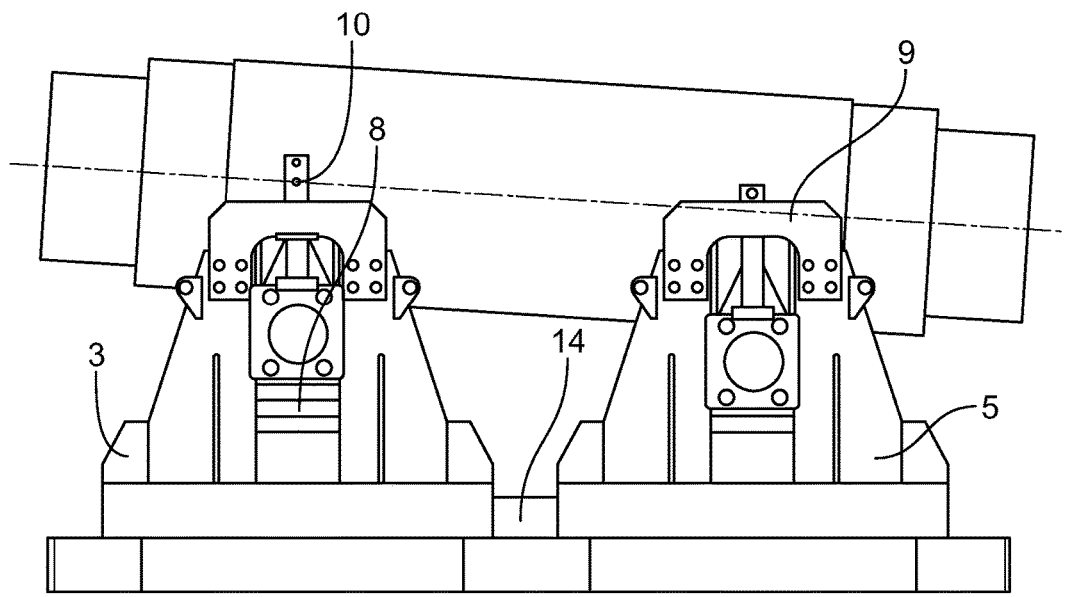
FIG. 3 illustrates a side view of a saddle support through which the method of the disclosure is implemented, with a pipeline oriented at an angle relative to a surface of pilework.
Figure 4:
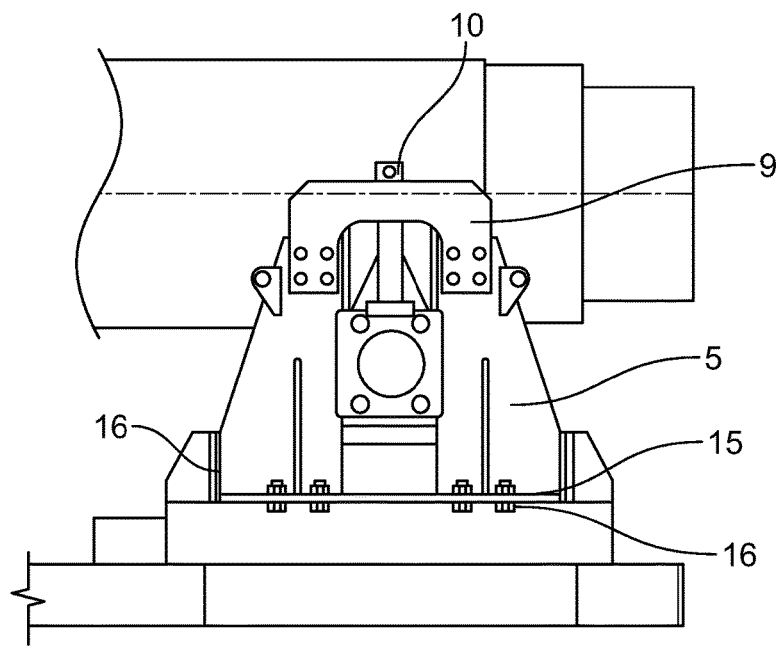
FIG. 4 illustrates a side view of an adjustable mechanism used to implement the disclosed method.

The drawings include the following elements, indicated by the corresponding reference numbers:
1. spool assembly with the support's heat insulation and the external case;
2. pipe;
3. side stop;
4. axis stop;
5. support frame;
6. subframe;
7. detachable stop;
8. adjustable plates;
9. top stop;
10. adjustable screw;
11. support axis;
12. pilework;
13. hydraulic jack;
14. detachable transportation stop;
15. screw joint with dielectric plugs and gaskets;
16. dielectric pads.

The claimed method may be implemented during both installation and operation of the saddle screen support. The support includes the following main units and details.

In particular, the support includes a heat-insulated spool 1 capable of being welding to the pipeline. The spool 1 includes a pipe 2 (also called a pipeline) with an internal shell attached to its central part (via welding or a bolt joint), to which stiffeners are tightly welded. The internal shell is made of a single milled sheet welded into the pipe 2 via girth seams. If the spool's bolt joint and the shell are applied, the shell includes two cylindrical saddles detached at the pipeline's axis. The spool 1 includes incombustible cellular glass as heat insulation. The external surface of the spool 1 is covered with an external case made of galvanized sheet metal. Transverse oriented support axes 11 are fixed under the external case in the lower part of the spool 1. These axes 11 include beams attached to the lower part of the spool 1 by additional stiffeners 17.

The support also includes four support frames 5. Each of the support frames 5 is a load-bearing stiff welded structure and is used to transmit stress from the pipeline to the pilework of the pile foundation. The support frames 5 are also used to adjust the support's height and slope angle. The frames 5 consist of a vertically oriented screen equipped with stiffeners and fixed on a horizontal subframe 6. The axis stop 4 is fixed in the central part of the screen and is movably positioned on guideways. An axis stop 4 includes a steel sheet having a central hole for receiving the support axis 11.

Top stops 9 are coupled to the frames 5 via bolt screws. Adjustable screws 10 are installed into the frames 5 and help fix the support axes 11 in the desired position.

Detachable stops 7 and detachable sets of adjustable plates 8 are installed into central holes of frames 5 for adjustment of the support's position at the desired height and slope angle.

Pads 16 made of dielectric material are used for electrical insulation of the support from the pilework and the pile foundation. The pads 16 are installed on the subframe 6 and the side stops 3.

Installation (assembly) of the saddle support is made as follows.

The support is transported to the site of operation and assembled with the support axes 11 fixed in the frames 5. The support is installed on the prepared pilework 12 of the pile foundation. The detachable transportation stop 14 is installed between two frames 5 at one side of the pipeline. After the support is installed on the pilework, the stop 14 is removed. The electric-insulated pads 16 are placed between the screen of the support frame 5 and the subframe 6. The screen and the subframe 6 are fixed via a bolt joint 15 through electric-insulated plugs using electric-insulated gaskets. The electric-insulated pads 16, gaskets and plugs are made, for instance, from Polytetrafluoroethylene (PTFE) which provides electric insulation of the support with a resistance of at least 100 kOhm.

After the support is installed on the pilework of the pile foundation and the first subframe 6 is fixed to the pilework (by tack welding or clamping screws), the vertical slope angle (if nessary) and the height of the support (if necessary) are set as follows. First, movable power-operated mechanisms that can lift the support spool are installed. Such mechanisms may include hydraulic jacks 13 installed pairwise under each support axis 11. Adjustable screws that press the support axes 11 are loosened allow vertical movement of the axis 11. Using the hydraulic jacks 13, the support axes 11 are lifted or lowered by an amount corresponding to the predetermined design angle height, such as in amounts of 15 mm. The adjustable plates 8 are then installed or uninstalled on the detachable stops 14 in an amount corresponding to the calculated value. During formation of the support slope angle, thickness of added plates 8 under the one support axis 11 corresponds to the thickness of removed plates 8 under the other support axis 11 such that the thickness of plates 8 added to the first axis 11 is the same as the thickness of plates 8 removed from the second axis 11.

After the adjustable plates 8 are installed as desired, the support spool 1 is lowered using the jacks 13 to rest on the adjustable plates. The second unfixed subframe 6 may then slide along the pilework if the support spool 1 is sloped. Then, top screws are used to fix the support spool in the desired position. After the adjustment procedure described above, the subframes 6 and the pilework are welded together, and then the support spool 1 is welded to the pipeline.

The pipeline axis (the support spool) can be adjusted when the soil subsides or heaves to restore the desired position. The hydraulic jacks 13 are installed under the support axes 11. The adjustable screws are loosened to allow free movement of the support axes 11 and the axis stops 4 along guideways in the frame hole. The support spool 1 and support axes 11 are lifted using the jacks 13. The necessary number of adjustable plates 8 are placed into the frame holes and placed on detachable stops. The general thickness of added plates on all four detachable stops is the same. If the level of the support spool 1 must be lowered, adjustable plates 8 having the same general thickness are removed for all detachable stops. After such adjustment, the support spool 1 and support axes 11 are lowered to the adjustable plates 8. Then the screws are turned until the support axes 11 are fully fixed in the frame holes.

The invention claimed is:

1. A method for adjusting a support spool to a desired height and slope angle during installation and during operation, comprising:
    installing the support spool in the desired height and slope angle by:
        installing and tightly fixing the support spool on two support axes that are transverse beams installed in support frames that are movable within frame holes of the support frames,
        installing at least one dielectric pad at a location between the support spool and a pilework foundation to electrically isolate the support spool from the pilework foundation,
        placing a movable power-operated mechanism under each of the two support axes,
        lifting or lowering the two support axes to achieve the desired height and slope angle using the movable power-operated mechanism,
        fixing the two support axes in the desired height and slope angle by positioning a predetermined number of adjustable plates below each of the two support axes,
        removing the movable power-operated mechanism;
    welding the support spool to a pipeline; and
    adjusting at least one of a height or slope angle of the support spool by:
        loosening the fixation of the two support axes in the support frames,
        placing the movable power-operated mechanism under each of the two support axes,
        lifting or lowering the two support axes to achieve the adjusted at least one of the desired height or slope angle using the movable power-operated mechanism, and
        fixing the two support axes in the desired height and slope angle by positioning a new predetermined number of the adjustable plates or equivalent adjustment plates below each of the two support axes.

2. The method of claim 1, wherein the support spool includes a pipe, an external case, a heat-insulated layer, an internal shell fixed in a central part of the support spool, and stiffeners attached to the internal shell.

3. The method of claim 1, wherein the support frames are welded support structures equipped by stiffeners that include vertically oriented screens, and wherein the method further includes installing detachable stops in the screens and allowing translational movement of the two support axes upon guideways in order to install the adjustable plates.

4. The method of claim 3, further comprising installing the adjustable plates on the detachable stops under the support axes and fixing adjustable screws into top stops above the support axes in order to fix the two support axes in place.

5. The method of claim 3, wherein installing the at least one dielectric pad includes installing the at least one dielectric pad between screens of the support frames and subframes and installing dielectric plugs and gaskets to further electrically isolate the support stool from the pilework foundation.

6. The method of claim 5, wherein the support frames include side stops that transmit axial stresses from the pipeline to the pilework foundation through the dielectric pads.

7. The method of claim 1, wherein the movable power-operated mechanisms include hydraulic jacks.

8. The method of claim 1, further comprising installing a detachable transportation stop between the support frames at one side of the pipeline during installation of the support spool.

9. The method of claim 1, wherein the two support axes include stiffeners attached to the support spool through a shell.

10. The method of claim 1, wherein installing the support spool in the desired height and slope angle further includes selecting the desired height and slope angle based on an expected amount of soil heaving.

11. The method of claim 1, wherein fixing the two support axes in the support frames using the adjustable plates includes adding first adjustable plates under a first support axis and removing second adjustable plates under a second support axis such that a thickness of the first adjustable plates is equal to a thickness of the second adjustable plates.

12. A pipeline support capable of adjusting a height of a support spool of the pipeline, comprising:
A first pipeline support comprising:
a subframe coupled to a pilework foundation;
a support frame coupled to the subframe;
a dielectric pad coupled between the subframe and the support frame for electrically isolating the support frame from the pilework foundation;
a support axis coupled to the support frame via adjustable fasteners and configured to be raised or lowered relative to the support frame; and
adjustable plates configured to be positioned below the support axis and to support the support axis at a desirable height such that the desirable height can be achieved by loosening the adjustable fasteners, using a movable power-operated mechanism to lift or lower the support axis, positioning an amount of adjustable plates that corresponds to the desirable height beneath the support axis, and tightening the adjustable fasteners; and
a second pipeline support comprising:
a second subframe coupled to the pilework foundation;
a second support frame coupled to the second subframe;
a second dielectric pad coupled between the second subframe and the second support frame for electrically isolating the second support frame from the pilework foundation;
a second support axis coupled to the second support frame via adjustable fasteners and configured to be raised or lowered relative to the second support frame; and
adjustable plates configured to be positioned below the second support axis and to support the second support axis at a desirable height such that the desirable height can be achieved by loosening the adjustable fasteners, using a movable power-operated mechanism to lift or lower the second support axis, positioning an amount of the adjustable plates that corresponds to the desirable height beneath the second support axis, and tightening the adjustable fasteners; and
a detachable transportation stop configured to be positioned between the first pipeline support and the second pipeline support during installation of at least one of the first pipeline support or the second pipeline support and to be removed after installation of one or both of the first pipeline support or the second pipeline support on the pilework foundation.

13. The pipeline support of claim 12, wherein the support axis is coupled to the support spool via stiffeners and is configured to support the support spool of the pipeline at the desirable height.

14. The pipeline support of claim 12, further comprising dielectric screw joints usable to fix the subframe to the support frame and to electrically isolate the subframe from the support frame.

* * * * *